(12) United States Patent
Tracy

(10) Patent No.: US 6,937,146 B2
(45) Date of Patent: Aug. 30, 2005

(54) VEHICLE ACCELERATION/DE-ACCELERATION WARNING LIGHT SYSTEM

(76) Inventor: Randy Lee Tracy, 976 E. Hyland Lake Dr., Murray, UT (US) 84121-1609

( * ) Notice: Subject to any disclaimer, the term of this patent is extended or adjusted under 35 U.S.C. 154(b) by 143 days.

(21) Appl. No.: 10/412,844

(22) Filed: Apr. 15, 2003

(65) Prior Publication Data

US 2004/0207519 A1 Oct. 21, 2004

(51) Int. Cl.⁷ .................................................. B60Q 1/44
(52) U.S. Cl. ................... 340/479; 340/464; 340/466; 340/467; 340/469; 362/499; 362/541
(58) Field of Search ........................... 340/464, 466–7, 340/469, 472–3, 479; 362/487, 496, 499, 541

(56) References Cited

U.S. PATENT DOCUMENTS

| | | | |
|---|---|---|---|
| 3,364,384 A | | 1/1968 | Dankert |
| 3,491,336 A | | 1/1970 | Anderson |
| 3,665,392 A | | 5/1972 | Annas |
| 3,711,828 A | * | 1/1973 | Hawkins ................... 340/464 |
| 3,784,974 A | * | 1/1974 | Hamashige ............... 340/464 |
| 3,908,144 A | | 9/1975 | Rudd |
| 4,384,269 A | * | 5/1983 | Carlson .................... 340/467 |
| 4,713,732 A | | 12/1987 | Schamblin |
| 4,812,807 A | * | 3/1989 | Davis et al. ............. 340/464 |
| 4,837,554 A | | 6/1989 | Gianforcaro |
| 5,164,701 A | * | 11/1992 | Nan-Mu et al. .......... 340/464 |
| 5,258,740 A | | 11/1993 | Viano et al. |
| 5,373,426 A | | 12/1994 | O'Sullivan |
| 5,537,091 A | | 7/1996 | Hull et al. |
| 5,680,101 A | | 10/1997 | Pitcher |
| 5,758,944 A | | 6/1998 | Jandron |
| 5,798,691 A | | 8/1998 | Kao |
| 5,805,060 A | * | 9/1998 | Schroeder ................. 340/467 |
| 5,966,073 A | | 10/1999 | Walton |
| 2002/0138181 A1 | | 9/2002 | Mori et al. |

* cited by examiner

Primary Examiner—Daniel Wu
Assistant Examiner—Travis Hunnings
(74) Attorney, Agent, or Firm—Marcus G. Theodore

(57) ABSTRACT

A front mounted vehicle warning light system extending sufficiently from the vehicle to be viewable from the front and front side of the vehicle to indicate if a vehicle is accelerating or de-accelerating.

17 Claims, 10 Drawing Sheets

VEHICLE ACCELERATION/DE-ACCELERATION WARNING LIGHT SYSTEM

BACKGROUND OF THE INVENTION

1. Field of Invention

The present invention relates to vehicles warning lights. In particular, it relates to a front mounted vehicle warning light indicating if a vehicle is accelerating or de-accelerating.

2. Description of Related Art

Various front mounted vehicle warning lights are known. O'Sullivan, U.S. Pat. No. 5,373,426 is a front mounted vehicle brake light for alerting pedestrians or other vehicle drives positioned in front of a vehicle that it is de-accelerating. Rudd, U.S. Pat. No. 3,908,144 discloses a sealed beam headlight with an additional brake light connected to the brake pedal of an automobile to not only provide forward illumination, but also signals operation of the braking system of the vehicle to those who can see the front of the vehicle. Both are difficult to be seen from the side, and do not indicate if the vehicle is accelerating. Dankert, U.S. Pat. No. 3,364,384, discloses a speed controlled signal system with a plurality of panels mounted to the front, back and side of a vehicle via a complex circuit to indicate whether a vehicle is accelerating or de-accelerating. Voano et al, U.S. Pat. No. 5,258,740 discloses front mounted cornering lamps selectively indicating brake and acceleration of a vehicle, which is visible from the front of a vehicle and one side. Gianfocaro, U.S. Pat. No. 4,837,554 discloses another speed controlled signal system with a plurality of panels mounted to the front, back and side of a vehicle via a complex circuit employing a motion switch using red and green lights to indicate whether a vehicle is accelerating or de-accelerating. Walton, U.S. Pat. No. 5,966,073 discloses front side and/or front mounted brake and running turn signal lights. Kao, U.S. Pat. No. 5,798,691 discloses an accessory LED brake light system secured to the front most central position of the automobile to provide warning signals when the automobile is braking to those positioned in front of the vehicle. Pitcher, U.S. Pat. No. 5,680,101 discloses a dash mounted forward facing brake light mounted within the passenger compartment. Anderson, U.S. Pat. No. 3,491,336 discloses a braking signal light mounted in the front of automotive vehicles with side windows. Annas, U.S. Pat. No. 3,665,392 discloses a brake light mounted to the front windshield of a motor vehicle. Hull et al., U.S. Pat. No. 5,537,091 discloses method of using existing wiring circuits of a vehicle to provide a pedestrian signal system for vehicles. Jandron, U.S. Pat. No. 5,758,944 discloses vehicle wrap around side/front brake lights. Schamblin, U.S. Pat. No. 4,713,732 discloses a vehicle light warning system employing a front mounted reflective sheet that flutters and moves in response to vehicle vibrations and/or wind during vehicle travel to be visible from oblique angles.

Mori et al., Pub. No. US 2002/0138181A1 is cited for general interest and discloses a vehicle expression operation control system for expressing an occupant's intention.

The present invention described below provides an improved front mounted vehicle acceleration/de-acceleration warning light system and kit.

SUMMARY OF THE INVENTION

The present invention comprises a front mounted vehicle acceleration/de-acceleration warning light system. It has a base with attachment structure to secure to the front of a vehicle, such as a magnetic base adapted to attach to metal bumpers or a removable clamp system. The base of the warning light system may be structured when the warning light system is preferably sold as a kit to removably mount to the front of the vehicle. In the kit embodiment, the power source employed is a replaceable battery system interconnected via wiring to the vehicle electrical system to selectively activate the lights during braking, acceleration and/or coasting. The kit circuitry preferably incorporates electrical means to increase the intensity of the traveling signal as the speed of the vehicle increases, as well as different braking and acceleration/coasting signals.

A reflective mirror with reflective surfaces is attached to the base to amplify and direct light in a desired direction. A light source is attached to the base and positioned above the reflective mirror surfaces. Light from the light source is then gathered by the reflective mirror surfaces for direction through a lens cover with facets. The lens cover preferably forms a weather tight seal with the base, and has facets aligned with the reflective mirror surfaces to direct light from the light source onto the ground in front of and along the front side of the vehicle. These facets may be etched or covered to emit a desired light pattern on the ground. The lens cover projects sufficiently from the base to be visible up to 180 degrees from the front and the side of the vehicle.

The light source is powered from a power source, such as the vehicle's battery and generator system, or an independent battery mounted within the base of the unit. A control circuit is associated with the brakes, the accelerator and/or wheels (i.e. odometer circuit) to selectively activate the light source when the vehicle is de-accelerating or accelerating to provide a braking signal in a braking mode, and a traveling signal in a moving mode.

The light source is controlled by a circuit, which provides a different signal for braking or accelerating/coasting. This may be a change in the flashing frequency sequence if a single light source is used. Preferably, the light source has two different wavelength frequencies each separately associated with the vehicle brakes, accelerator, and/or odometer circuits to provide a braking signal different from the traveling signal. In one preferred embodiment, the wavelength frequency for braking is red, and the wavelength frequency for acceleration or coasting is green. The light source may comprise a single intense halogen type of light, or a plurality of electronic digital lights separately mounted in association with the facets of the lens cover.

In another preferred embodiment, the facets of the lens cover are aligned to direct light beams onto the ground to form a pool of light along the front and front side of the vehicle. The facets may also be structured to project a warning shaped pattern of light into a crosswalk to warn pedestrians. The shape of the lens cover itself is also distinctive to distinguish it from the front headlights, such as a diamond shape with facets in a V to direct light along the ground to illuminate in front and along the front side of the vehicle making it more visible to onlookers. This prevents the headlights from detracting from the braking/acceleration signals.

In one preferred embodiment, the lens cover facets are structured as prisms to more truly focus and direct light from the light source. In other variations, the lens cover itself acts as a multi-faceted prism.

A special frequency signal emitter may be included and associated with the control circuit to emit an acceleration/de-acceleration signal to be picked up by a mobile receiver worn by a pedestrian and activated when the pedestrian approaches a crosswalk. For the blind, it is preferably adapted for mounting to a cane or other electronic device used by the blind. This provides added warning to both the sited and the blind, if a vehicle were not stopping when they utilize a crossing walk.

In another embodiment, the frequency signal of the invention is tuned to the frequency of receivers of various electronic devices currently available to the blind, such as Electronic Travel Aids (ETA's), which send out signals to sense the environment within a certain range and furnishes the user with information. The person may detect higher objects that the cane does not locate. Some aides may narrow down the location of an object or even determine the size of the object. ETA's are used in conjunction with a cane or dog guide.

Other electronic devices employed by the blind, such as Pathsounder™ developed in the late 1960's may also be synchronized. Pathsounder™ is a small, battery operated sonar device, which compliments the long cane use. It is chest mounted and warms user of objects ahead. It emits ultrasonic waves up to six feet away. It alerts the user to objects through vibration and auditory signals.

Walkmate™ detects objects and provides output to the user by a beeping sound. A vibration device can be set for the neck. The closer to an object the faster the Walkmate™ beeps or vibrates and can easily synchronized to respond to the present invention's signals.

Mowat™ is used along with the long cane or dog guide. It is a handheld device with vibratory output. It emits an ultrasonic cone of two changeable ranges. It can be set for a three-foot range or thirteen-foot range. It is silent in free space and detects the nearest object within its range. It vibrates when an object is within range. It vibrates at a faster rate the closer it becomes to an object, and can be synchronized to respond to the present invention's signals.

Sonic Guide™ was developed to give the blind a greater perception of the environment using the auditory sense. It provides protection from above the head to the knees. It again is used with the dog or cane for travel needs. When trained appropriately the user is able to detect much more detail about objects, and can also be synchronized to respond to the present invention's signals.

The Laser Cane is basically a long cane with electronic detection. Three laser beams leave the cane to act as an early warning system. One beam is meant to protect or give warning to the head area. Another forward beam detect objects in the travel path ahead. A downward beam provides early warning for drop-offs. Each beam has a different signal sound for the user. The forward channel has both an auditory signal and tactile output. It can be adapted to receive a warning signal from the present invention.

The present invention is therefore particularly adapted to provide vehicle braking and acceleration/or coasting warning signals to motorists, emergency vehicles, and pedestrians, including the blind.

BRIEF DESRIPTION OF THE DRAWINGS

DESCRIPTION OF THE ILLUSTRATED EMBODIMENTS

Figure 1:
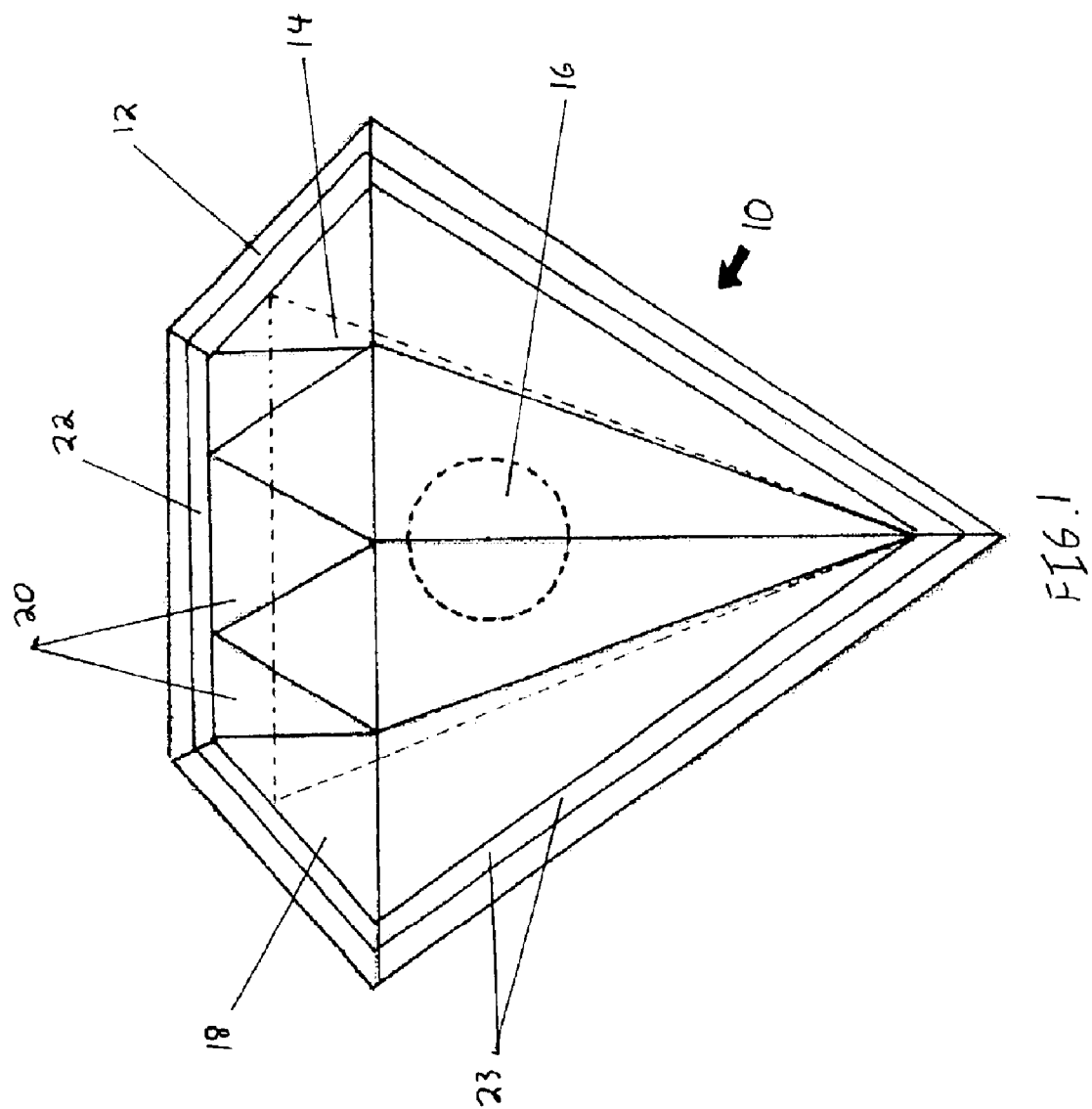
FIG. 1 is a front view of a preferred embodiment of the invention.
Figure 2:
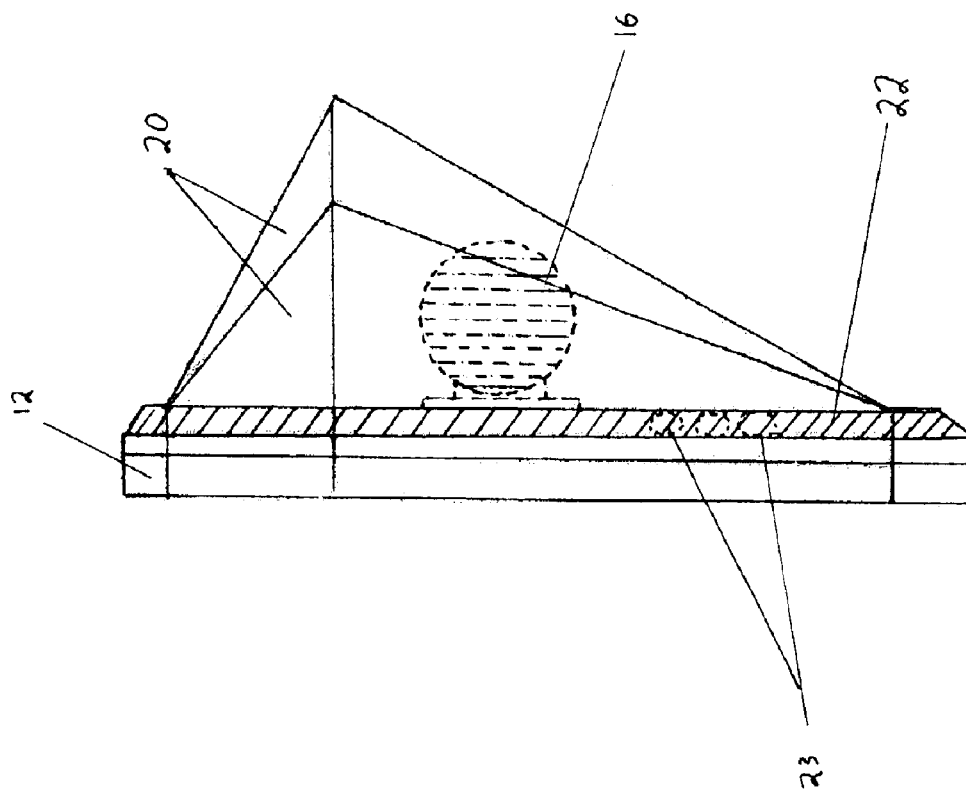
FIG. 2 is a side view of the embodiment of the invention shown in FIG. 1.
Figure 8:
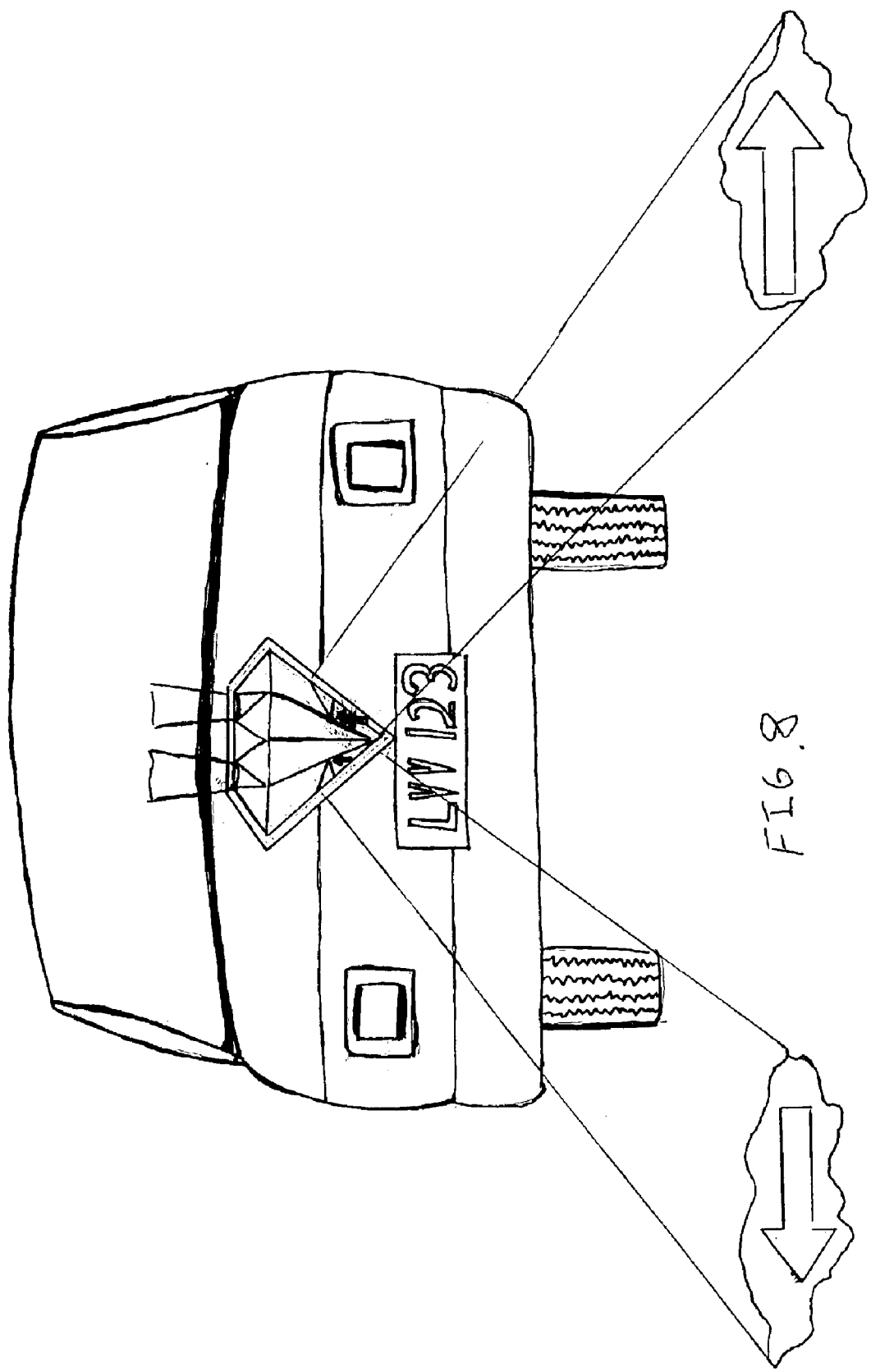
FIG. 8 is a front view of the embodiment of the preferred embodiment of the invention employing the lens show in FIG. 5 mounted to the front of an automobile.

FIG. 1 is a front view of a preferred embodiment of the invention 10. The present invention comprises a front mounted vehicle acceleration/de-acceleration warning light system 10. It has a flexible magnetic base 12 to secure to the front of a ferromagnetic bumper or mount of a vehicle. Preferably, the magnetic base 12 is a shaping magnet capable of attaching to and molding to the shape of a bumper. A reflective mirror 14 with reflective surfaces is attached to the base 12 to amplify and direct light in a desired direction. A light source 16 is attached to the base 12 and positioned above the reflective mirror 14 surfaces. Light from the light source 16 is then gathered by the reflective mirror 14 surfaces for direction through a lens cover 18 with facets 20. The lens cover 18 forms a weather tight seal with the base 12. It has facets 20 aligned with the reflective mirror 14 surfaces to direct light from the light source 16 onto the ground in front of the vehicle as shown in FIG. 8. The lens cover 18 is projects sufficiently from the base 12 to be visible up to 180 degrees or more from the front to the front side of a vehicle.

FIG. 1 includes a second light source 22 attached along the perimeter of the base 12. This second light source has green wavelength color frequency and is operably associated with the accelerator and or odometer to provide a green signal when the vehicle is accelerating and/or coasting. The first light source 16 is a red light and operably associated with the brakes to provide a red braking signal. The first light source 16 comprises a single intense halogen type of light.

The second light source 22 comprises a plurality of green electronic digital lights 23 mounted along the perimeter of the base 12. It is associated with the vehicle's electrical circuit such that when the vehicle accelerates, the green digital lights 23 get proportionately brighter depending upon the vehicle speed. This warns a pedestrian that a driver is trying to run a stoplight. Preferably the brightness of the digital lights 23 is scaled from 1 to 10. At freeway speeds, the brightness is reduced to an intensity of approximately a scale of 3 to prevent the lights from wearing out prematurely or interfering with other drivers.

Both light sources 16, 22 are covered by a transparent clear lens cover 18, whose facets 22 direct light in the desired direction. It is replaceable and can be interchanged with other lens colors and patterns to suit the preference of a user.

Figure 9:
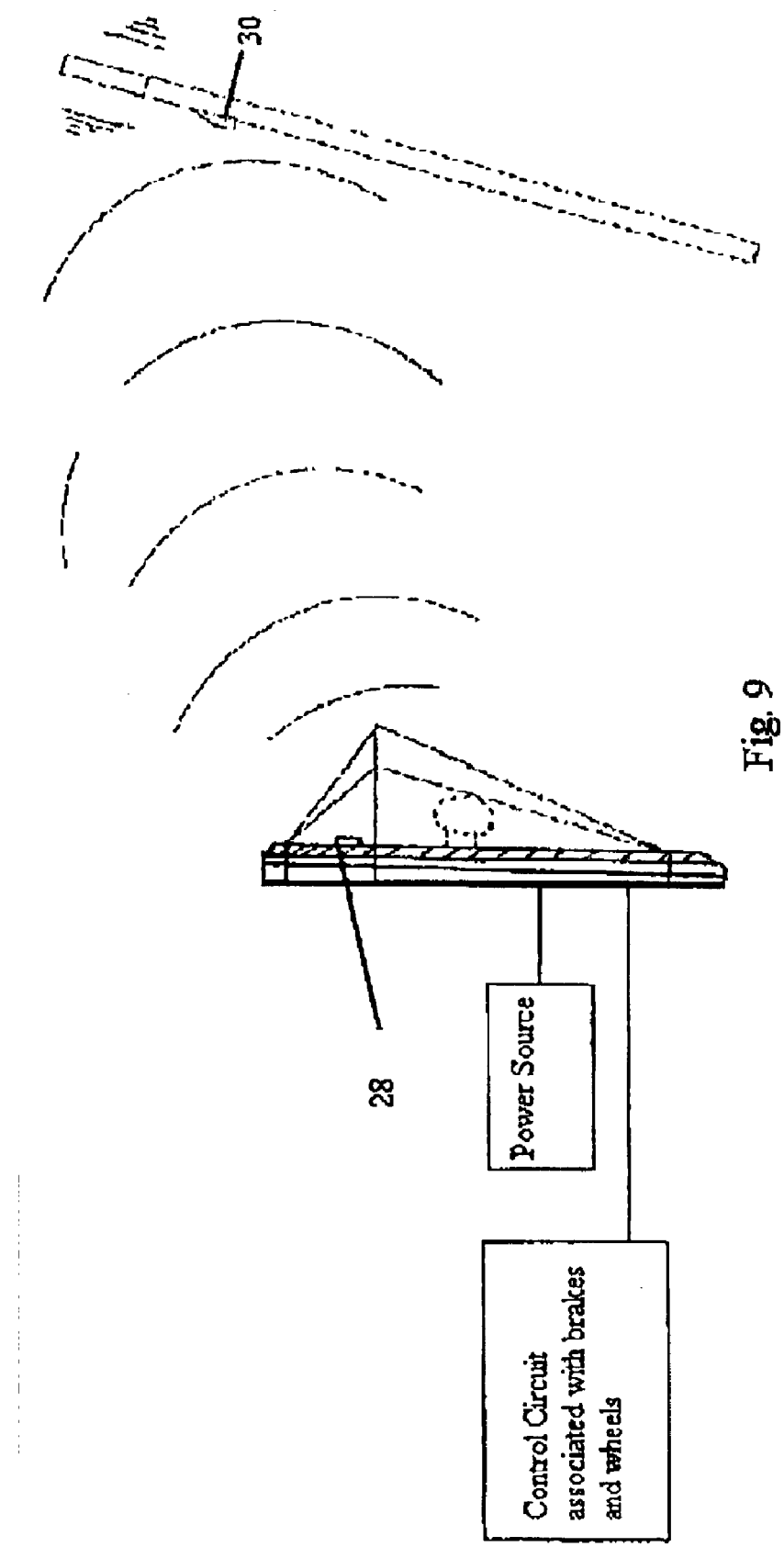
FIG. 9 is a perspective view of the invention employed with an electrical sensing device for the blind.

The light source is powered from a power source shown in FIG. 9, such as the vehicle's battery and generator system (not shown), or an independent battery (not shown) mounted within the base 12 of the unit. A control circuit (shown in FIG. 9 similar to those discussed in the prior art section) is associated with the brakes and the accelerator or odometer circuit to selectively activate the light sources 16, 22 when the vehicle is de-accelerating or accelerating to provide a braking signal in a braking mode, and a traveling signal in a moving mode.

Figure 3:
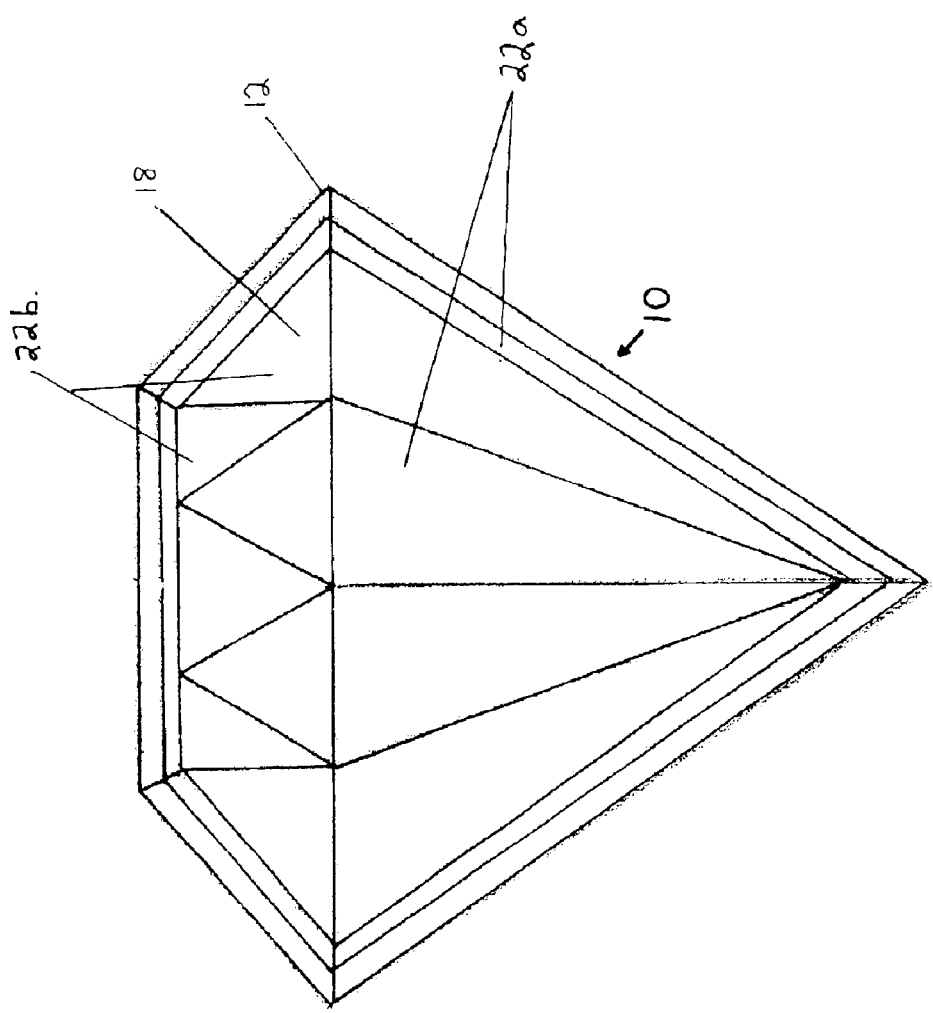
FIG. 3 is a front view of a preferred embodiment of the lens of the invention.

The preferred shape of the lens cover 18 is diamond shaped as shown in FIGS. 1 and 3 to distinguish it from the front headlights. The diamond shaped V facets direct light in a 180 degree or more direction in a manner to illuminate in front and along the front side of the vehicle making it more visible to onlookers.

Figure 4:
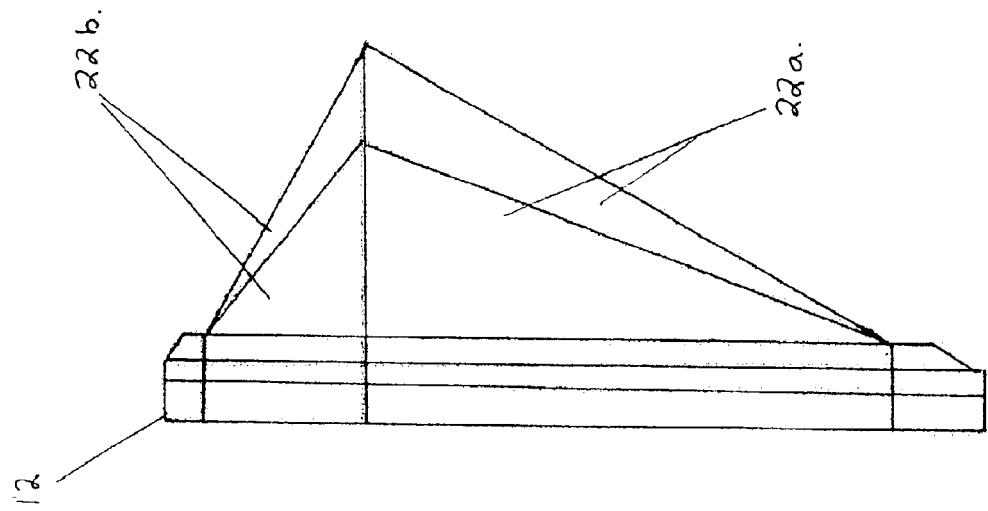
FIG. 4 is a side view of the preferred embodiment of the lens of the invention shown in FIG. 3.

FIGS. 3 and 4 are front and side views of the preferred lens cover 18 of FIG. 1. The lens cover 18 lower facets 22a direct concentrated beams onto the ground in front and to the front side of the vehicle to form a light pattern along the front and front side of the vehicle. The lens cover 18 upper facets 22b direct concentrated beams on top of the vehicle to illuminate the hood and cabin. This latter configuration is particularly used for heavy trucks with vertical cabs to make them more visible to vehicles driving in front of them, as well as pedestrians.

The facets 22a may also be used to project a warning shaped light pattern, such as that shown in FIG. 8, into a crosswalk to warn pedestrians. FIGS. 6 and 7 illustrate front and side views of the lens cover 18 facets 22a, 22b, which are structured as prisms to direct focused beams as shown in FIG. 5.

Figure 5:
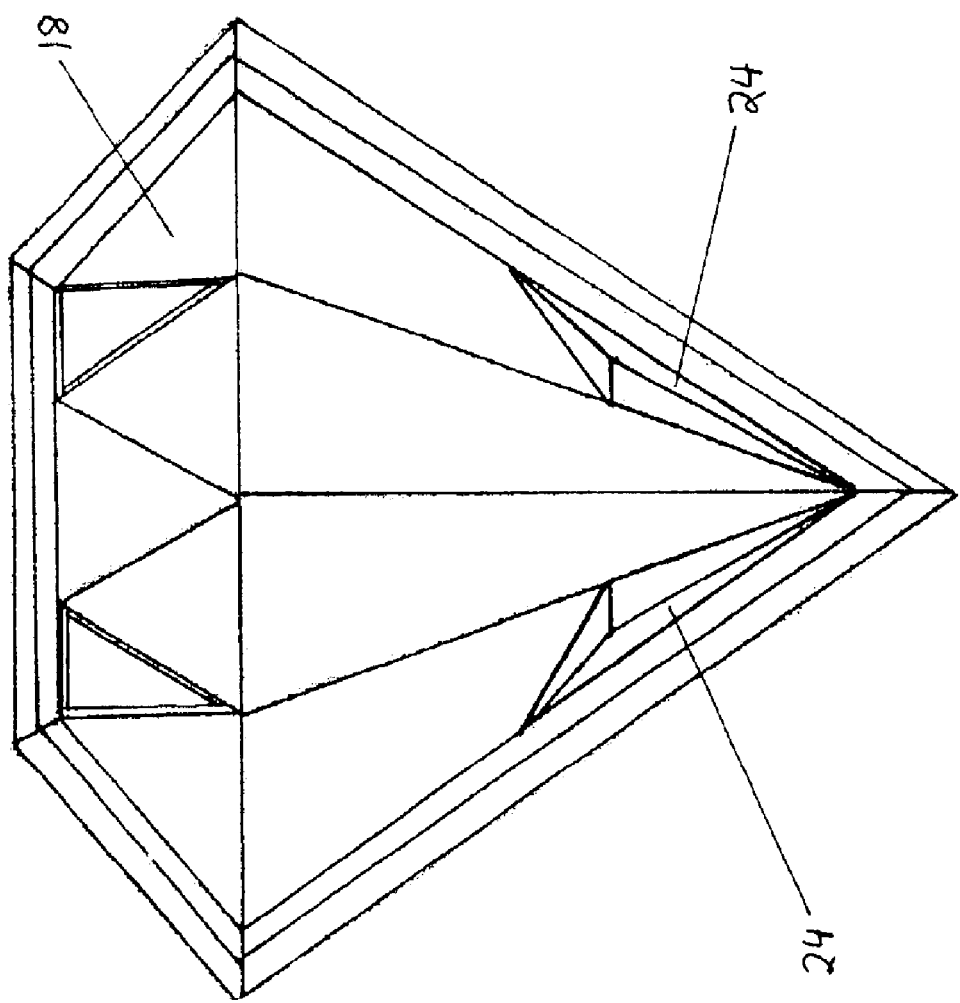
FIG. 5 is a front view of another preferred embodiment of the lens of the invention.
Figure 6:
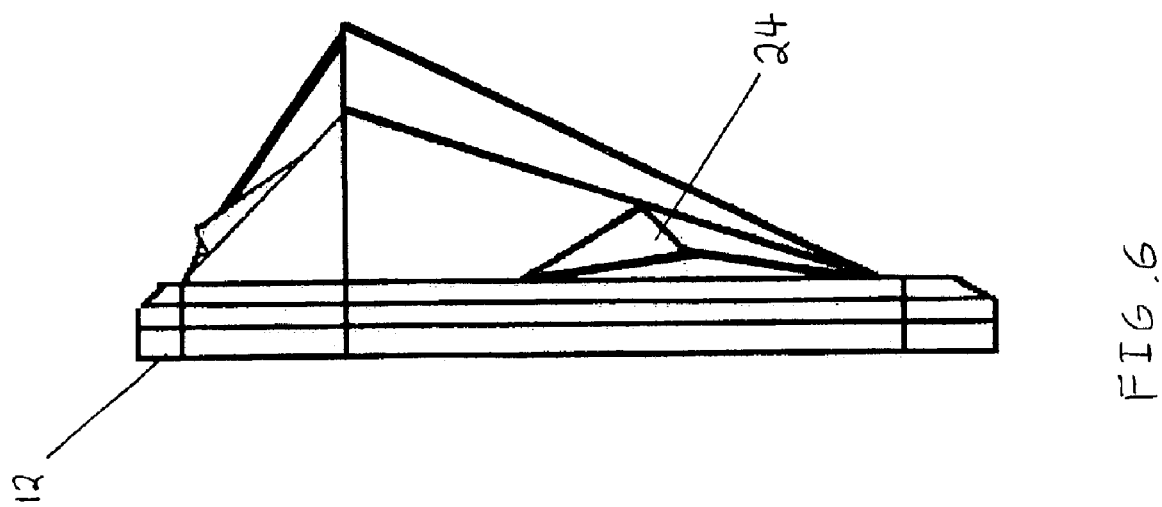
FIG. 6 is a side view of the embodiment of the invention shown in FIG. 5.
Figure 7:
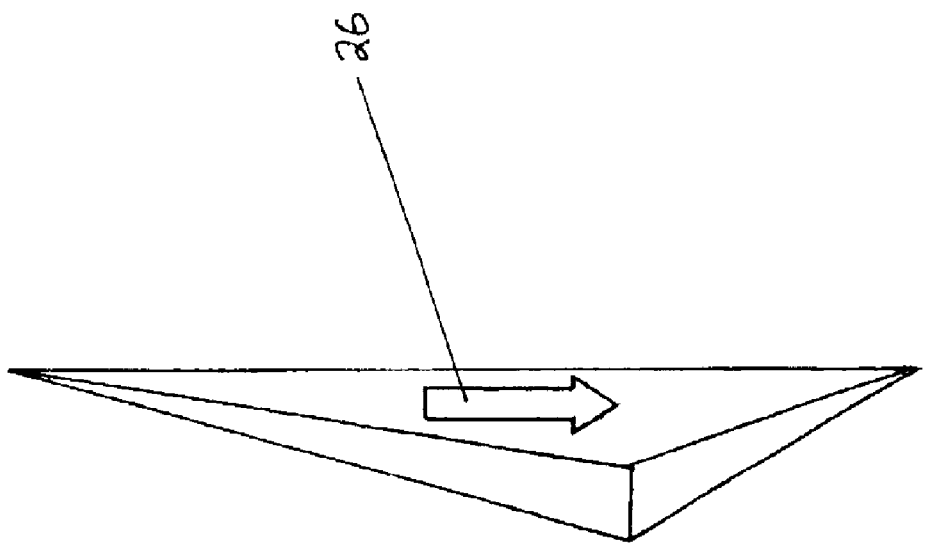
FIG. 7 is a perspective view of a facet of the lens shown in FIG. 5 to project a light pattern shape.

As shown in front and side views FIGS. 5 and 6 of a preferred lens cover 18, the triangle shaped lens facets 22, may include additional prism lenses 24 to more truly focus and direct light from the light source in the desired direction. These prism lenses 24 may also include an etched light pattern 26 shown in FIG. 7 to project a light patterned image onto the ground as shown in FIG. 8.

A special frequency signal emitter 28 shown in FIG. 9, may be associated with the control circuit (not shown) to emit an acceleration/de-acceleration signal to be picked up by a mobile receiver 30 shown mounted on a cane for the blind. The mobile receiver 30 includes an on/off switch (not shown), which is activated when a user approaches a cross walk. This provides added warning to the blind, if a vehicle were not stopping when a blind person utilizes a crossing walk.

The warning light system 10 may be structured as a kit to removably mount to the front of the vehicle. In a kit embodiment, the power source employed is the vehicle electrical system to selectively activate the circuit (not shown) and selectively power the lights during braking, acceleration and/or coasting. The kit 10 circuit preferably incorporates electrical means similar to that discussed in the prior art to increase the intensity of the traveling signal as the speed of the vehicle increases.

Figure 11:
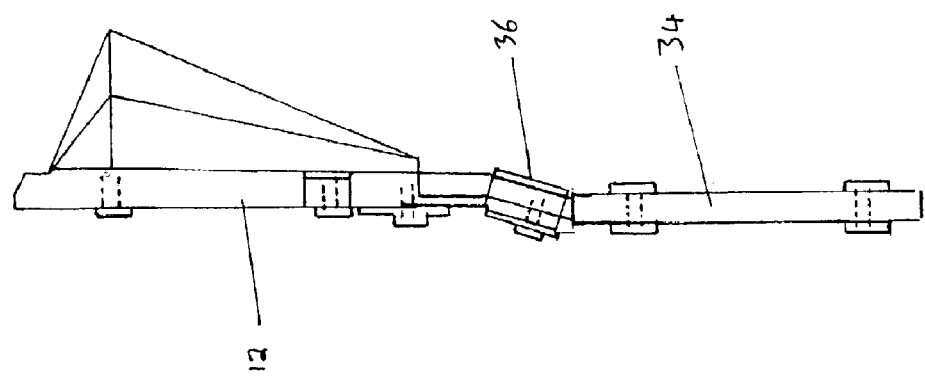
FIG. 11 is a side view of a preferred mounting bracket system shown in FIG. 10.
Figure 10:
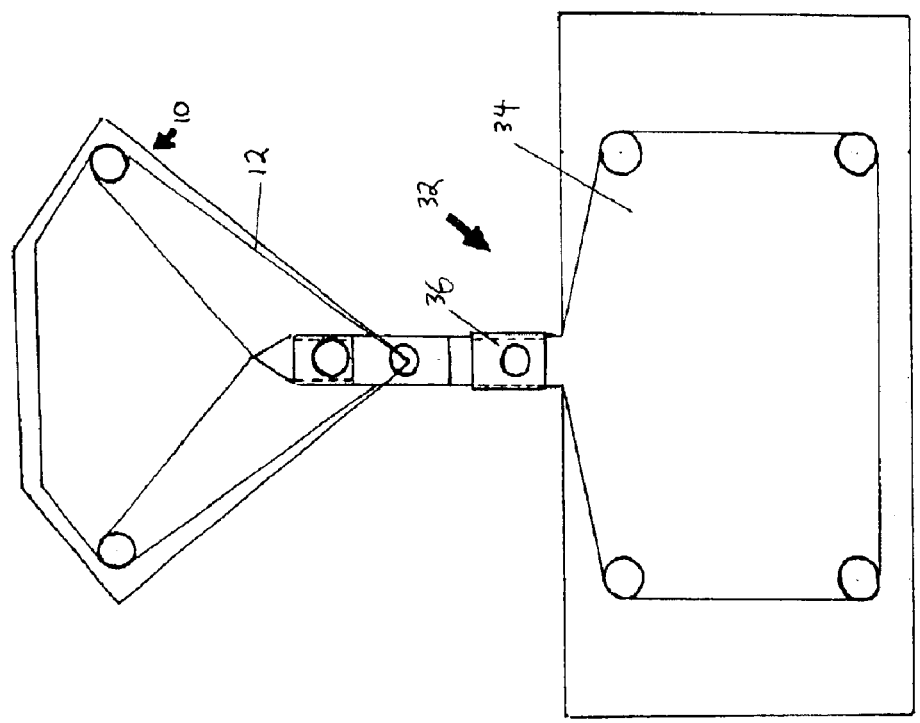
FIG. 10 is a perspective view of a preferred mounting bracket system.

FIGS. 10 and 11 are front and side views of a preferred mounting skeletal bracket system 32 structured to attach to a vehicle's front license plate holder. It has a plate mount 34 adapted to bolt to a vehicle's front license plate holder. It has a slide adjustable pin push/pull lock system extender 36 attached to the warning light base 12 to elevate the warning light system 10 preferably above and to the center of the vehicle bumper to insure that it is visible from the front and sides of the vehicle. The skeletal bracket system 32 preferably is slightly angled to position the extender 36 out to clear the bumper and simultaneously extend the warning light system 10 to improve visibility.

The above description and specification should not be construed as limiting the scope of the invention but as merely providing illustrations of some of the presently preferred embodiments of this invention. Thus, the scope of the invention should be determined by the appended claims and their legal equivalents rather than by the examples given.

I claim:

1. A front mounted vehicle acceleration/de-acceleration warning light system comprising:
   a. a base with attachment structure to secure to the front of a vehicle,
   b. a reflective mirror with reflective surfaces attached to the base,
   c. a light source attached to the base and positioned to direct light onto the reflective mirror surfaces for reflection and direction through
   d. a lens cover with facets aligned with the reflective mirror surfaces to direct a warning light pattern from the light source onto the ground in front of the vehicle, said lens cover projecting sufficiently from the base to be visible from the sides and front of the vehicle,
   e. a power source associated with the light source, and
   f. a control circuit associated with the brakes and the wheels to selectively activate the light source when the vehicle is de-accelerating or accelerating to provide a braking signal in a vehicle braking mode, and a traveling signal in a vehicle traveling mode.

2. A front mounted vehicle acceleration/de-acceleration warning light system according to claim 1, wherein the circuit associated with the light source generates different flashing sequences for vehicle braking and vehicle traveling.

3. A front mounted vehicle acceleration/de-acceleration warning light system according to claim 1, wherein the light source has two different wavelength frequencies each separately associated with the brakes and wheels to provide a braking signal different from the traveling signal.

4. A front mounted vehicle acceleration/de-acceleration warning light system according to claim 3, wherein the wavelength frequency for braking is red, and the wavelength frequency for traveling is green.

5. A front mounted vehicle acceleration/de-acceleration warning light system according to claim 2, wherein the light source comprises a plurality of electronic digital lights.

6. A front mounted vehicle acceleration/de-acceleration warning light system according to claim 1, wherein the facets of the lens cover direct light beams onto the ground to form a pool of light along the front and front sides of the vehicle.

7. A front mounted vehicle acceleration/de-acceleration warning light system according to claim 1, wherein the lens cover has a distinctive shape to distinguish it from a vehicle's front headlights.

8. A front mounted vehicle acceleration/de-acceleration warning light system according to claim 7, wherein the lens cover is diamond shaped with facets in a V to direct light along the front and front side of the vehicle.

9. A front mounted vehicle acceleration/de-acceleration warning light system according to claim 1, including a signal emitter associated with the control circuit to emit an acceleration/de-acceleration signal adapted to be picked up by a mobile receiver worn by a pedestrian, said receiver having an on/off switch activated when the pedestrian approaches a crosswalk, and including a warning signal to advise the pedestrian if a vehicle were not stopping at the crosswalk.

10. A front mounted vehicle acceleration/de-acceleration warning light system according to claim 9, wherein the mobile receiver constitutes an electronic cane or traveling device for the blind.

11. A front mounted vehicle acceleration/de-acceleration warning light system according to claim 1, wherein the base of the warning light system is structured to removably mount to the front of the vehicle.

12. A front mounted vehicle acceleration/de-acceleration warning light system according to claim 11, wherein the base is constructed of a magnetic moldable material adapted to conform to the shape of the front end of the vehicle and adhere to ferromagnetic surfaces.

13. A front mounted vehicle acceleration/de-acceleration warning light system according to claim 11, wherein the base of the warning light system includes structure to secure the warning light system to the front license plate holder of a vehicle with extenders to position the warning light system at a desired height and distance from the front of the vehicle.

14. A front mounted vehicle acceleration/de-acceleration warning light system according to claim 1, wherein the power source is a battery.

15. A front mounted vehicle acceleration/de-acceleration warning light system according to claim 1, wherein the intensity of the traveling signal increases as the speed of the vehicle increases.

16. A front mounted vehicle acceleration/de-acceleration warning light system according to claim 1, wherein the lens cover is structured as a prism to focus and direct light from the light source.

17. A front mounted vehicle acceleration/de-acceleration warning light system according to claim 1, wherein the lens cover is replaceable and can be interchanged with other lens colors and warning light patterns to suit the preference of a user.

* * * * *